United States Patent [19]

Tokuda

[11] Patent Number: 5,083,152
[45] Date of Patent: Jan. 21, 1992

[54] PHOTOGRAPH PROCESSING DEVICE

[75] Inventor: Kanji Tokuda, Kanagawa, Japan

[73] Assignee: Fuji Photo Film Co., Ltd., Kanagawa, Japan

[21] Appl. No.: 556,509

[22] Filed: Jul. 24, 1990

[30] Foreign Application Priority Data

Jul. 28, 1989 [JP] Japan .................................. 1-196240
Jun. 6, 1990 [JP] Japan .................................. 2-147873

[51] Int. Cl.⁵ ............................................ G03B 27/80
[52] U.S. Cl. ...................................... 355/27; 355/38; 355/30; 355/68
[58] Field of Search ...................... 355/27, 28, 68, 38, 355/30, 77

[56] References Cited

U.S. PATENT DOCUMENTS

4,809,198 2/1989 Terashita .......................... 355/38 X

Primary Examiner—L. T. Hix
Assistant Examiner—D. Rutledge
Attorney, Agent, or Firm—Sughrue, Mion, Zinn, Macpeak & Seas

[57] ABSTRACT

A photograph processing device comprises an exposing section for printing an image on a light-sensitive material in accordance with exposure conditions, a processor section for performing developing, fixing, washing and drying operations with respect to the printed light-sensitive material, a density measuring unit provided in the vicinity of the light-sensitive material exit side of the processor section for photometering the light-sensitive material to provide an image density signal free from the influence of temperature that is caused by subjecting the light-sensitive material to the drying operation, and an exposure condition correcting unit for correcting the exposure conditions in accordance with the image density signal outputted from the density measuring unit. The influence of temperature is avoided by cooling the light-sensitive material to be photometered or correcting the image density of the light-sensitive material that is measured by the density measuring unit, and the exposure conditions are corrected in accordance with the image density signal free from the influence of temperature; therefore, optimal exposure conditions can be set.

24 Claims, 8 Drawing Sheets

PHOTOGRAPH PROCESSING DEVICE

BACKGROUND OF THE INVENTION

1. Field of the Invention

The present invention relates to a photograph processing device and more particularly, to a printer processor which has the functions of measuring the density of an image recorded on a light-sensitive material and correcting exposure conditions in accordance with the image density measured, and automatically performs operations, such as printing and developing.

2. Description of the Related Art

To always finish color prints with good quality in printer processors, a developing operation must be performed properly and exposure conditions for a printing section must be set accurately. In view of the foregoing, standard exposure conditions are set at the time of installing the printer processor. However, exposure conditions must be corrected and re-set when color paper with a different emulsion number is used, a printer lamp is changed, developing solution is changed, the number of colors contained in a photograph increases or decreases with the turning of the seasons, or at similar events. To correct the exposure conditions, a reference negative film is prepared with including negative frames containing the image of a gray object. The gray object on the negative film is photographed on color paper which is printed and subjected to developing, fixing, washing and drying operations, thereby producing a test print. The reference density of a previously-printed/developed reference print and the image density of the foregoing test print are measured using a densitometer. They are then compared to derive correction values by which the exposure conditions are set.

The principle of correction will be described with reference to a set of simplified exposure calculation expressions (1) as below. However, C, M and Y designate primary colors (subtractive).

$$\left. \begin{array}{l} D_{CO} = C_C(D_C - D_{NC}) + K_C I_C + K_D I_D + B_{PC} + B_{NC} \\ D_{MO} = C_M(D_M - D_{NM}) + K_M I_M + K_D I_D + B_{PM} + B_{NM} \\ D_{YO} = C_Y(D_Y - D_{NY}) + K_Y I_Y + K_D I_D + B_{PY} + B_{NY} \end{array} \right\} \quad (1)$$

where $D_{CO}, D_{MO}, D_{YO}$: the density for exposure control, for a paper channel, $D_C, D_M, D_Y$: the integral transmission density (LATD) measured value of a negative frame to be printed, $I_C, I_M, I_Y$: the number of color key stages (0 for no correction), $I_D$: the number of density key stages (0 for no correction), $K_C, K_M, K_Y$: the value of color key step, $K_D$: the value of density key step, $B_{PC}, B_{PM}, B_{PY}$: paper balance value (0 for a reference value).

for a constant paper channel, $B_{NC}, B_{NM}, B_{NY}$: negative-type balance value (0 for a reference), $D_{NC}, D_{NM}, D_{NY}$: the density of a reference negative frame (normal) of the above-mentioned negative type, $C_C, C_M, C_Y$: the value of slope (this has a different value depending on "O" or "U" as follows:

$C_{CO}, C_{MO}, C_{YO}$: the value of overslope of the above-mentioned negative type, $C_{CU}, C_{MU}, C_{YU}$: the value of underslope of the above-mentioned megative type).

The amount of exposure $E_R$ for red (R), for example, is determined by $$E_R = E_N \cdot 10^{COD} \quad (2)$$

where $E_N$ is the constant or amount of exposure of the reference negative frame (normal) of the above-mentioned negative type. Similarly, the amount of exposures for green (G) and blue (B) are determined by $D_{MO}$ and $D_{YO}$, respectively.

Letting $\Delta D_{PC}$ be a minute density change of cyan of the color paper and $\gamma_C$ be the value of $\gamma$, there is the following expression:

$$\Delta D_{PC} = \gamma C \cdot \Delta \log(E_R) \quad (3)$$

and from the expressions (2) and (3), the following expression (4) is obtained:

$$\Delta D_{PC} = \gamma C \cdot \Delta D_{CO} \cdot \log(E_N) \quad (4)$$

From this (4), $\Delta D_{CO}$ can be calculated backward.

Letting $\Delta D_{PC}$, $\Delta D_{PM}$, $\Delta D_{PY}$ be the difference between the denisty of the normal test print of the reference negative type and the density of the reference print, if the result of calculation $D_{CO}$ of the expression (1) is set as below:

$$D_{CO}' = D_{CO} - \Delta D_{CO} \quad (5)$$

the difference $\Delta D_{PC}$ can be made zero by changing a certain constant which depends on what density the reference negative frame has. Similarly to the expression (5), the following are defined:

$$D_{MO}' = D_{MO} - \Delta D_{MO} \quad (6)$$

$$D_{YO}' = D_{YO} - \Delta D_{YO} \quad (7)$$

Condition settings are made as follows.

① In the case of a normal negative

The measured density $D_C, D_M, D_Y$ of the normal negative frame is stored in $D_{NC}, D_{NM}, D_{NY}$ of the negative type channel.

A normal negative print is produced, and the correction value $\Delta D_{CO}, \Delta D_{MO}, \Delta D_{YO}$ is obtained in accordance with the expression (5), (6), (7) from the difference between the density of the reference print and the density of the normal negative print, and is stored in $B_{NC}, B_{NM}, B_{NY}$ of the negative type channel.

② In the case of over negative (performed after Item ① above)

An over negative print is produced, the value $D_{CO}', D_{MO}', D_{YO}'$ is obtained in accordance with the expression (5), (6), (7) from the difference between the density of the over negative print and the density of the reference print. The value of overslope $C_{CO}, C_{MO}, C_{YO}$ which makes the result of the calculation $D_{CO}, D_{MO}, D_{YO}$ of the expression (1) equal to the foregoing value is calculated backward, and stored in $C_{CO}, C_{MO}, C_{YO}$ of the negative type channel.

③ In the case of under negative (performed after Item ①)

Similar to Item ②, the value $C_{CU}, C_{MU}, C_{YU}$ is obtained and stored in $C_{CU}, C_{MU}, C_{YU}$ of the negative type channel. In the prior art, the density in the item ①, ②, ③ was manually measured and the related negative type channel was manually designated. The constants for the negative channel are listed in the following table.

TABLE

|   | nega. type 1 | nega. type 2 | nega. type 3 | ... |
|---|---|---|---|---|
| B | $B_{NC} B_{NM} B_{NY}$ | $B_{NC} B_{NM} B_{NY}$ | $B_{NC} B_{NM} B_{NY}$ | ... |
| N | $D_{NC} D_{NM} D_{NY}$ | $D_{NC} D_{NM} D_{NY}$ | $D_{NC} D_{NM} DNY$ | ... |
| O | $C_{CO} C_{MO} C_{YO}$ | $C_{CO} C_{MO} C_{YO}$ | $C_{CO} C_{MO} C_{YO}$ | ... |
| U | $C_{CU} C_{MU} C_{YU}$ | $C_{CU} C_{MU} C_{YU}$ | $C_{CU} C_{MU} C_{YU}$ | ... |

In conventional printer processors, the drying operation is attained by exposing the test print to high-temperature air; thus, the temperature of the dried test print is as high as about 90° C. at the time of density measurement. It is known that the image density of the print varies with temperature, especially, the density of cyan varies largely with temperature, and the cyan density of the print at about 90° C. is smaller by about 5% than that at room temperature. Therefore, the image density of the test print immediately after drying differs from that at room temperature. Thus, if correction values for the exposure conditions are calculated on the basis of the image density of the test print immediately after drying, optimal exposure conditions at room temperature cannot be obtained.

SUMMARY OF THE INVENTION

It is an object of the present invention to provide a photograph processing device or printer processor which can obtain an image density signal free from the influence of the temperature of a light-sensitive material, thereby setting optimal exposure conditions.

To accomplish the foregoing object, the present invention provides a photograph processing device which comprises an exposing section for printing an image on a light-sensitive material in accordance with exposure conditions, a processor section for subjecting the printed light-sensitive material to developing, fixing, washing and drying operations, density measuring means provided on the light-sensitive material exit side of the processor section for photometering the light-sensitive material and providing an image density signal free from the influence of temperature that is caused by drying the light-sensitive material, and exposure condition correcting means for correcting the exposure conditions in accordance with the image density signal provided from the density measuring means.

Preferably, the density measuring means comprises a cooling section provided on the light-sensitive material exit side of the processor section for cooling the light-sensitive material, and a density measuring section for measuring the image density of the cooled light-sensitive material.

Since the light-sensitive material is dried in the processor section, the temperature of the light-sensitive material becomes high. The image density at high temperature differs from that at room temperature. However, the density measuring means according to the present invention provides an image density signal free from the influence of temperature that is caused by the drying operation. That is, an image density signal free from the influence of the temperature of the light-sensitive material is obtained, thereby setting optimal exposure conditions. An image density signal free from the influence of the temperature is obtained by forming density measuring means using the cooling section for cooling the light-sensitive material and the density measuring section for measuring the image density of the cooled light-sensitive material, and measuring the image density of the cooled light-sensitive material. In this way, by cooling the light-sensitive material by the cooling section, the temperature change of the density measuring section decreases, and the output of the density measuring section becomes stable.

The cooling section for cooling the light-sensitive material down to room temperature may include rollers made of a good-heat-conductive material such as metal which are designed to hold therebetween the light-sensitive material whose temperature has increased during the drying operation; in this case, room-temperature air is applied to cooling fins provided at one end or inside each roller, whereby the light-sensitive material can be indirectly cooled.

Further, the density measuring means may include a density measuring section for measuring the image density of the light-sensitive material, a temperature measuring section for measuring the temperature of the light-sensitive material, and a correcting section for correcting the image density measured by the density measuring section in accordance with the temperature of the light-sensitive material; in this case, the image density is corrected in accordance with the temperature, whereby the image density signal free from the influence of temperature can be obtained.

DESCRIPTION OF THE PREFERRED EMBODIMENTS

Embodiments of the present invention will now be described in greater detail with reference to the drawings.

Figure 1:
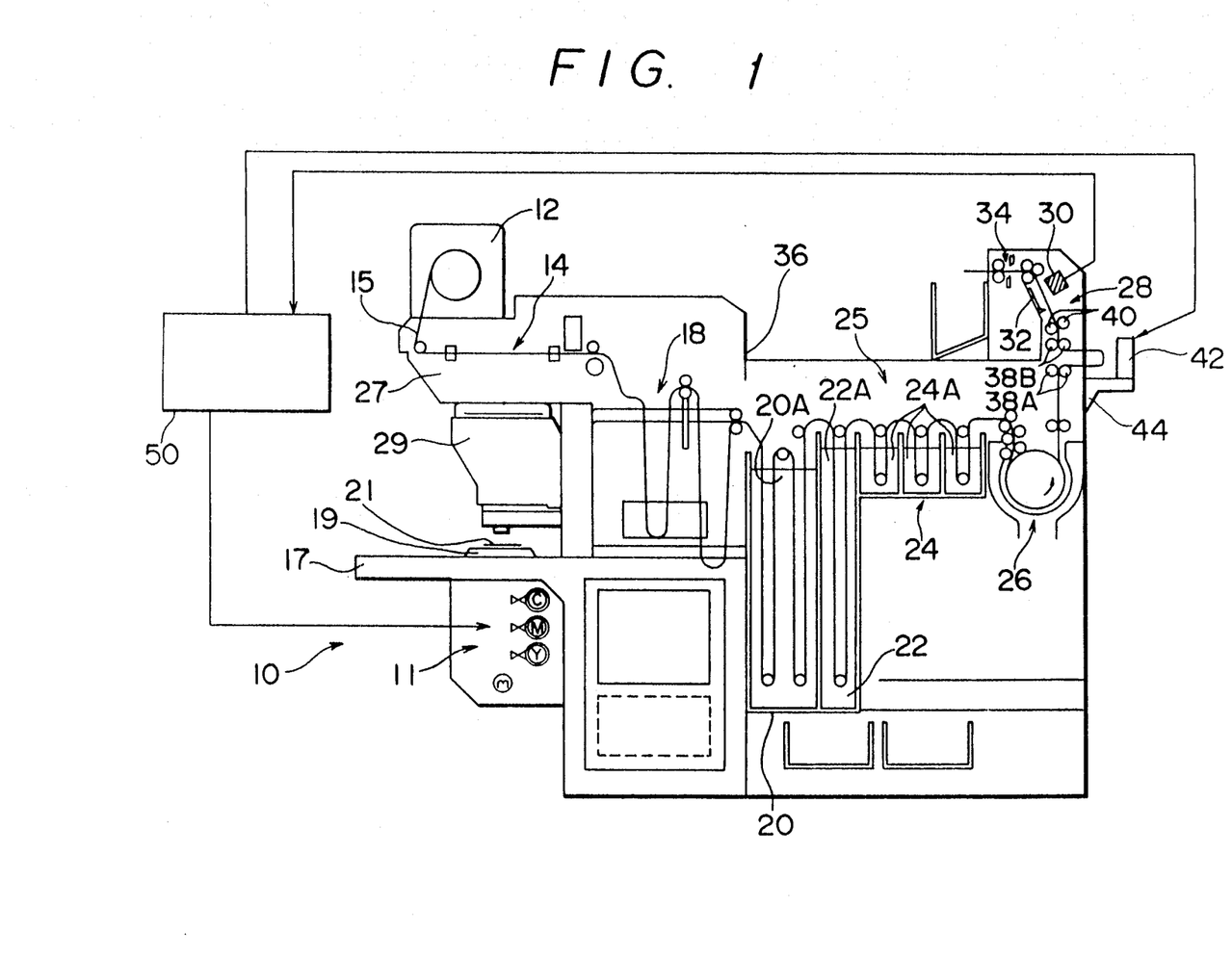
FIG. 1 is a schematic diagram of a printer processor according to an embodiment of the present invention.

FIG. 1 shows a printer processor 10 according to an embodiment of the present invention. The printer processor 10 is covered with a casing 36. The printer processor 10 is equipped with a working table 17 which projects leftward from the casing 36 as viewed in FIG. 1. A negative film carrier 19 onto which a negative film 21 is set is mounted on the upper face of the working table 17. A light source section 11 equipped with C, Y and M filters is provided below the working table 17. The light source section 11 is connected to a control circuit 50 for controlling the C, Y and M filters in order to control exposure conditions. A light beam emitted from the light source section 11 passes through the negative film 21 and an optical system 29 including lenses and a shutter not shown. The image of the negative film 21 is then focused on color paper 15 set in an exposing section 14. The optical system 29 is attached to an arm 27 which projects from the printer processor 10.

A paper magazine section 12 which is detachably provided on the arm section 27 holds the color paper 15 therein in rolled form. The color paper 15 on which the image of the negative film 21 is printed in the exposing section 14 is transferred to a reservoir section 18 adjacent to the exposing section 14. The reservoir section 18 receives the printed color paper 15 therein such that the difference in processing time between the exposing section 14 for a printing operation and a processor section 25 for developing, fixing and washing operations is absorbed. The color paper 15 delivered from the reservoir section 18 is transferred to a color developing section 20 of the processor section 25 adjacent to the reservoir section 18. The color paper 15 is immersed in a developing solution 20A in the color developing section 20 for developing. The developed color paper 15 is transferred to a bleaching/fixing section 22 adjacent to the color developing section 20. The color paper 15 is then immersed in a fixing solution 22A in the bleaching-/fixing section 22 for fixing. The fixed color paper 15 is transferred to a rinsing section 24 adjacent to the bleaching/fixing section 22. The color paper 15 is immersed in a wash water 24A in the rising section 24 for washing off unwanted substances adhering to the color paper 15.

Figure 2:
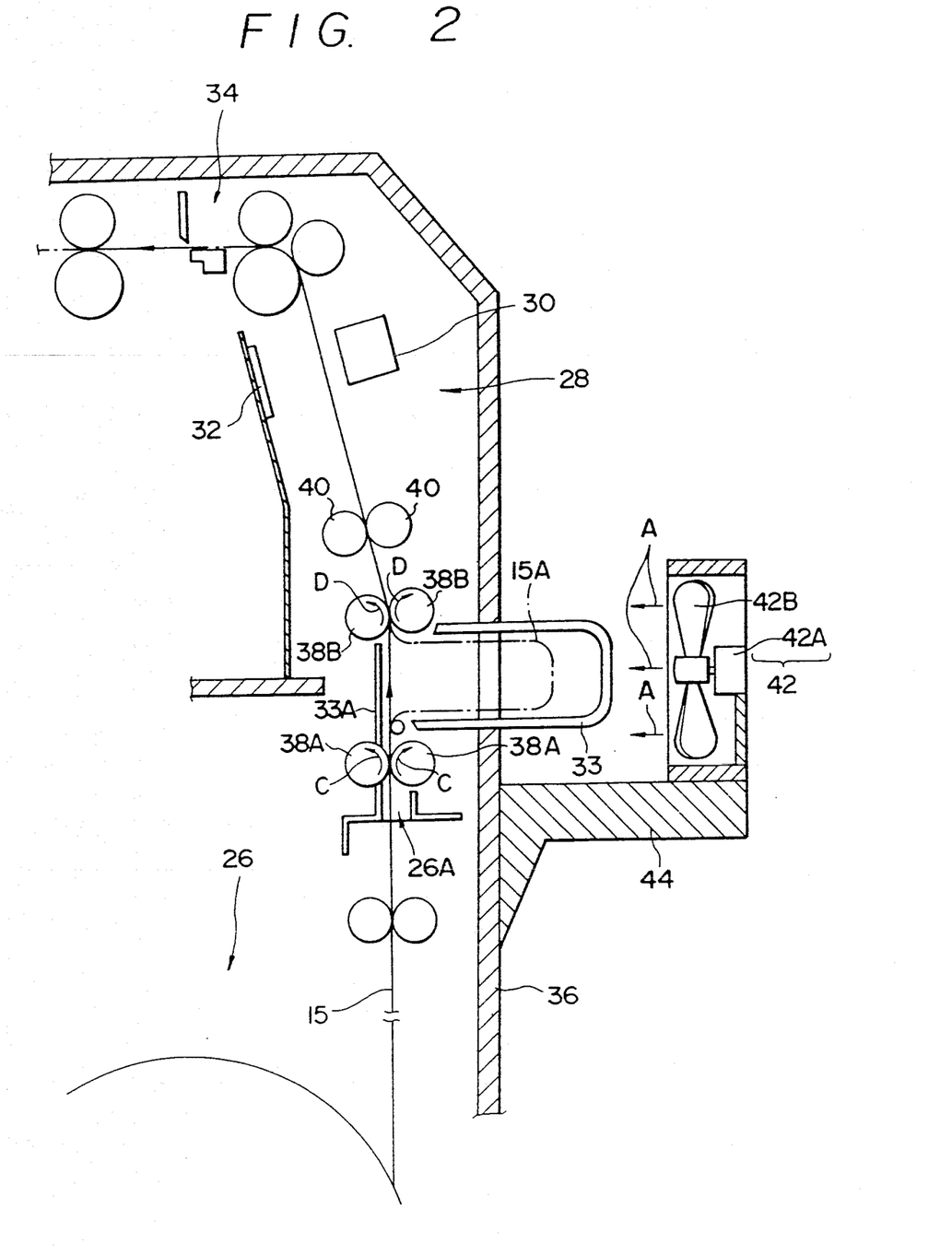
FIG. 2 is a sectional view showing an electric fan and its neighboring area.

The washed color paper 15 is transferred to a drying section 26 adjacent to the rinsing section 24. In the drying section 26, the color paper 15 is moved along the periphery of rollers and exposed to high-temperature air so as to be dried. As shown in FIG. 2, a pair of rollers 38A for guiding the color paper 15 is provided in the vicinity of an outlet port 26A of the drying section 26. The rollers 38A are rotated in the directions of the arrows C in FIG. 2 by the driving force of driving means not shown. With the color paper 15 held between the rollers 38A, the dried color paper 15 is delivered from the drying section 26 through the outlet port 26A at a fixed speed. A pair of rollers 38B is provided above the rollers 38A. The rollers 38B are rotated in the directions of the arrows D in FIG. 2 by the driving force of driving means not shown. Specifically, the rollers 38B are rotated intermittently in the directions of the arrows D by the driving means so as to correspond to the operation of a cutter section 34 provided on the downstream side of the drying section 26; consequently, with the color paper 15 held between the rollers 38B, it is transferred frame by frame in steps. A color paper guide member 33 and a plate member 33A are provided opposite each other between the rollers 38A and the rollers 38B. The travel path of the color paper 15 passing between these members. The color paper guide member 33 is composed of two substantially U-shaped bars (see FIG. 4), whose (curved) portions project outward beyond the casing 36. The color paper guide member 33 and the plate member 33A guide a sag portion of the color paper 15 (that is formed due to the difference in rotational speed between the rollers 38A and the rollers 38B) toward the outside of the casing 36 so that a loop portion 15A illustrated by the imaginary line in FIG. 2 results.

Figure 4:
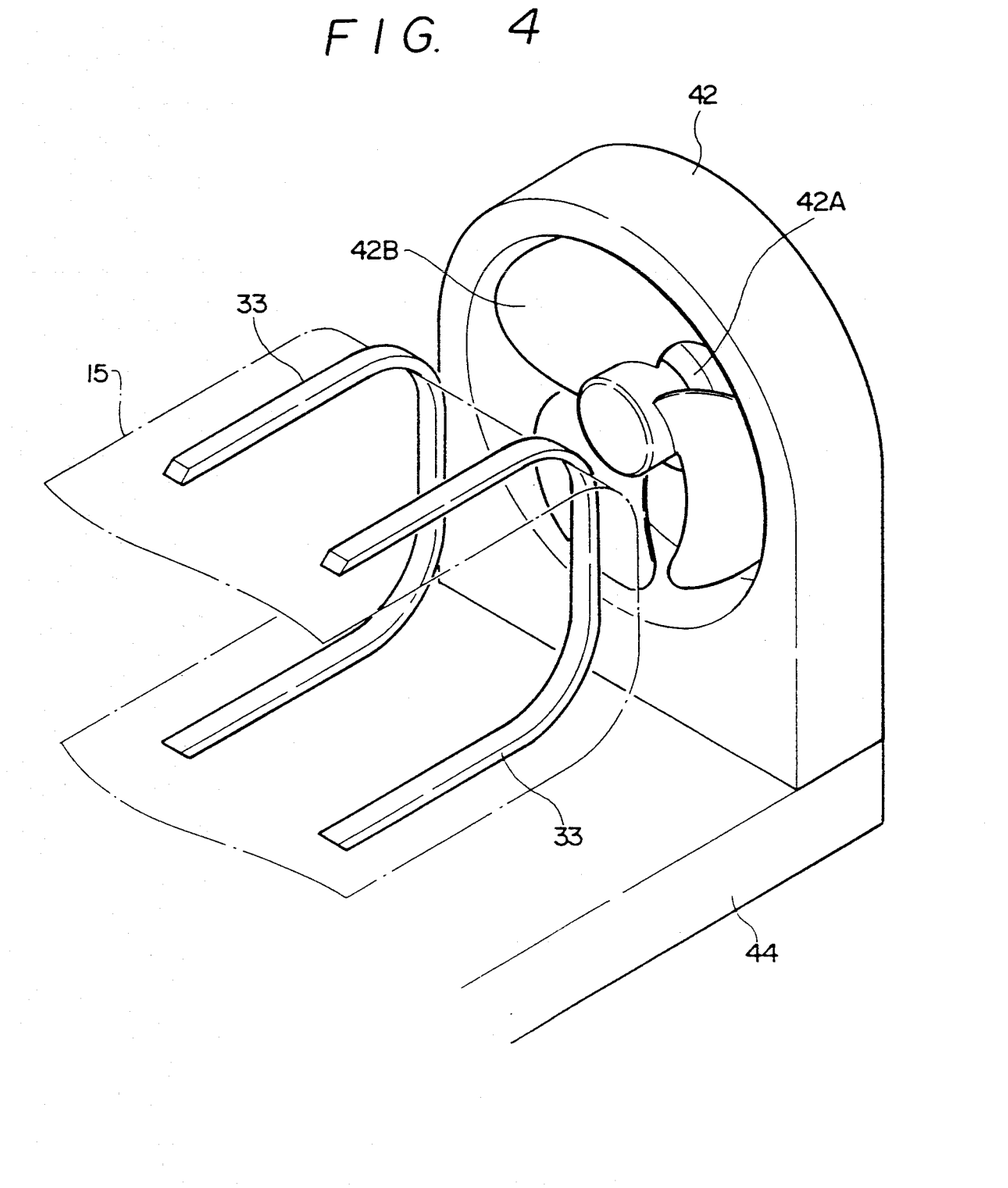
FIG. 4 is a perspective view showing a color paper guide member and its neighboring area.

As shown also in FIG. 4, an electric fan 42 acting as cooling means is provided on the upper face of a deck 44 projecting from the casing 36 so as to correspond to the color paper guide member 33. The electric fan 42 includes a motor 42A and a rotary vane 42B which is secured to the rotary shaft of the motor 42A. The motor 42A is connected to the control circuit 50 (see FIG. 1) so that its driving force is controlled. The electric fan 42 blows an adequate quantity of air in the direction of the arrow A in FIG. 2 to cool the color paper 15.

A density measuring section 28 is provided above the drying section 26. The density measuring section 28 includes a densitometer 30. The densitometer 30 and a reference print 32 having a reference density are provided opposite each other above a pair of rollers 40. The color paper 15 is transferred between the densitometer 30 and the reference print 32. As shown in FIG. 1, the densitometer 30 is connected to the control circuit 50. The densitometer 30 measures the density of the color paper 15 and the reference print 32, and sends the measurement results to the control circuit 50. On the left side of the density measuring section 28 as viewed in FIG. 1 a cutter section 34 is provided. The cutter section 34 includes a sensor for sensing cut marks in the color paper 15 and a cutter for cutting off the color paper 15. In the cutter section 34, each frame of the color paper 15 is cut off in accordance with the cut marks and ejected outward from the casing 36 of the printer processor 10.

A reference negative color film 52 used in correcting the exposure conditions will be described with reference to FIG. 3. This reference negative color film 52 is produced by subjecting an unexposed film to exposure under predetermined conditions and to development so as to result in an under-exposed negative color frame 53, an over-exposed negative color frame 54, and a reference negative color frame 55. Each of these negative color frames has a gray portion 56 and a yellow-green portion 57. The gray portion 56 is circular and located in the center of each negative color frame. The gray portion 56 corresponds to a negative film onto which a gray object has been photographed. The yellow-green portion 57 is located around the gray portion 56 and corresponds to a negative film onto which a yellow-green object has been photographed.

The procedure of setting the exposure conditions of the printer processor 10 will be described with reference to FIGS. 1 through 3.

Figure 3:
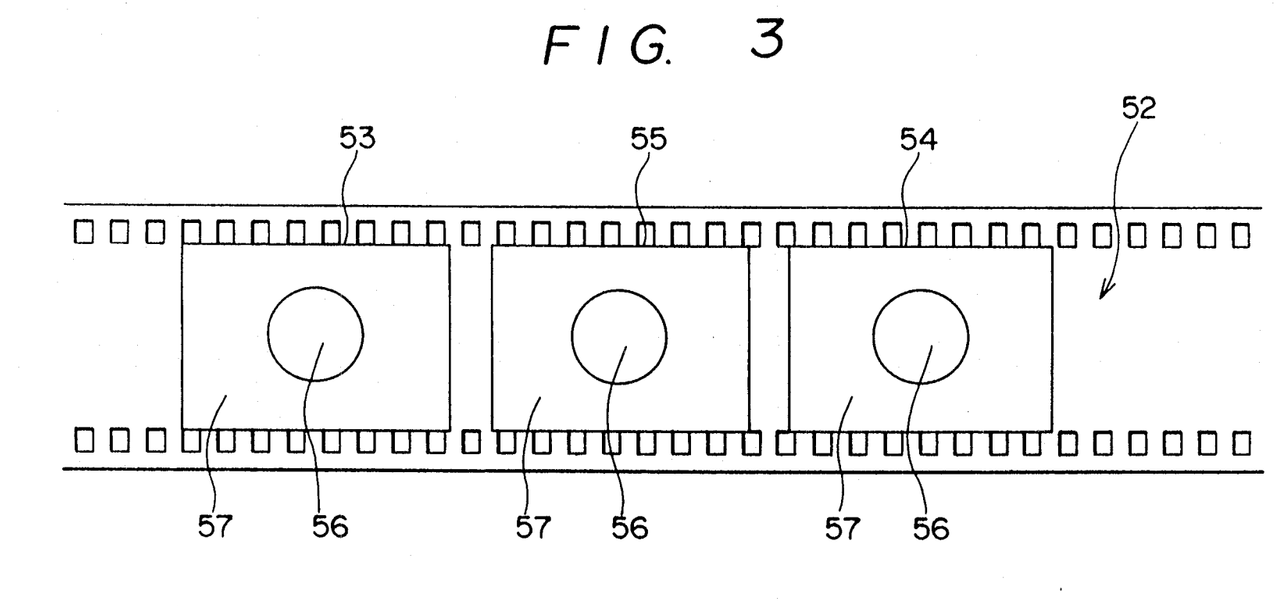
FIG. 3 is a plan view showing a reference negative color film.

The reference negative film 52 shown in FIG. 3 (including the under-exposed negative color frame 53, the over-exposed negative color frame 54, and the reference negative color frame 55) is set on the negative film carrier 19, when a switch (not shown in FIG. 1) for setting the exposure conditions is turned on, an exposure condition setting operation begins which turns on a lamp of the densitometer 30. When a few tens of seconds elapses after the lamp turns on, the densitometer 30 measures the density; therefore, the reference density of the reference print 32 is measured and stored in the control circuit 50. In the exposing section 14, the color paper 15 is printed with the images of the under-exposed negative color frame 53, the over-exposed negative color frame 54, and the reference negative color frame 55. In the developing section 20, the developing operation takes place with respect to the printed color paper 15; in the bleaching/fixing section 22, the fixing operation takes place; and in the rinsing section 24, the washing operation takes place; thereby resulting in a test print. In the drying section 26, the drying operation takes place with respect to the test print. Specifically, in the drying section 26, the test print with moisture having adhered to the surface thereof during the washing operation is exposed to high-temperature air so as to be dried. At this time, the temperature of the test print becomes high because of exposure to high-temperature air, and its image density also varies from that at room temperature. The dried test print is guided by the color paper guide member 33 between the rollers 38A and the rollers 38B so that a portion projects outward beyond the casing 36 to define the loop portion 15A (see FIG. 2).

Outside the casing 36 of the printer processor 10, the electric fan 42 supplies an adequate quantity of air toward the loop portion 15A of the test print, whereby the test print whose temperature has increased during the drying operation is cooled down to about room temperature. The cooled test print is guided to the density measuring section 28. In the density measuring section 28, the densitometer 30 measures the density at substantially the center of the gray portion 56 of each negative color frame of the test print. Since at this time the temperature of the test print has returned to the region of room temperature, the densitometer 30 always measures the density of the test print whose temperature is close to room temperature. The densitometer 30 then sends the density thus measured to the control circuit 50.

The control circuit 50 calculates the correction values for the exposure conditions on the basis of the density of the test print and the density of the stored reference print in the manner described above, and controls the light source section 11 in accordance with the correction values. Specifically, the reference negative color frame 55 is used in correcting variations in the conditions of the printer processor, the color balance after changing the print lamp, the color balance after changing the developing solution, the seasonal change in negative color balance of the object, the balance of the emulsion number of the color paper, etc. The underexposed negative color frame 53 is used in correcting the under negative balance of a channel currently used. The over-exposed negative color frame 54 is used in correcting the over negative balance of the channel currently used.

As described above, since the color paper 15 whose temperature increased during the drying operation is cooled by the electric fan 42, it is possible to measure the image density of the color paper 15 whose temperature is close to room temperature, whereby optimal exposure conditions can be set. Consequently, it is not necessary to manually correct the exposure conditions, the interval of time up to the moment of re-setting the exposure conditions can be elongated, and the work of maintenance service for the printer processor 10 can be reduced. In addition, since the color paper 15 is cooled to about room temperature at the time of density measurement, the temperature of the densitometer 30 itself is not increased because of the presence of the color paper 15; therefore, the output of the densitometer 30 becomes stable. The sensor for detecting the cut marks in the cutter section 34 also operates stably because it is not influenced by temperature. Since the temperature of the color paper 15 becomes uniform over the length thereof, the curled state of the color paper 15 is also uniform; thus, the color paper 15 can be handled stably in transferring, winding, cutting, etc.

Figure 5:
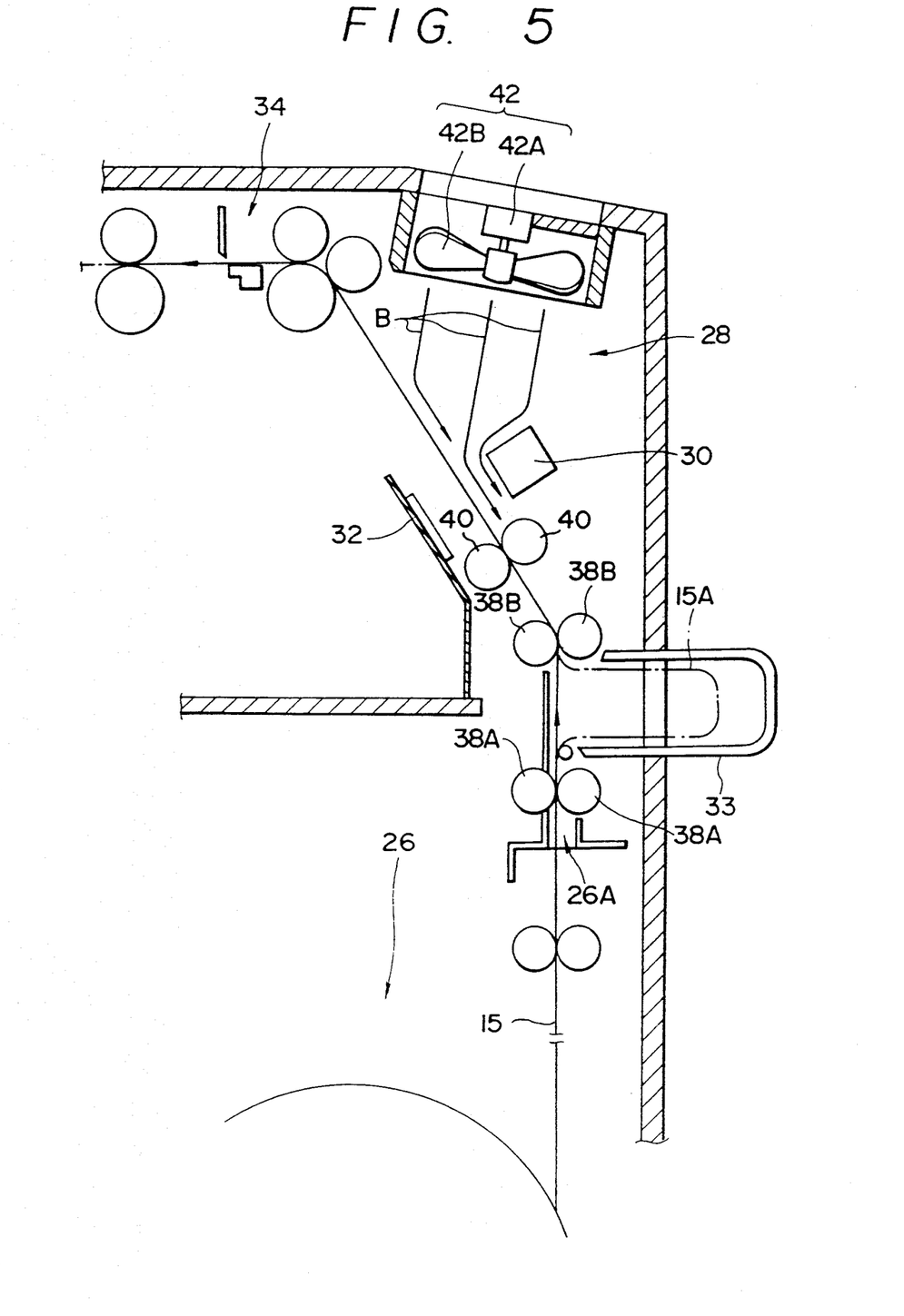
FIGS. 5 and 6 are sectional views showing other embodiments of the present invention.

In this embodiment the electric fan 42 is being provided between the drying section 26 and the density measuring section 28. However, the electric fan 42 may be provided in the density measuring section 28 as shown in FIG. 5 such that room-temperature air is supplied in the direction of the arrow B. What is required is that the temperature of the color paper 15 be cooled down to about room temperature when the density is measured by the densitometer 30.

In this embodiment the cooling section includes the electric fan 42 to perform forced cooling. What is required, however, is that the color paper 15 be cooled down to about room temperature; therefore, the effective length of the loop portion 15A of the color paper 15 that comes in contact with room-temperature air may be increased by the use of rollers or the like to subject the color paper 15 to natural cooling.

In this embodiment the color paper guide member 33 formed the loop portion 15A in the color paper 15. The color paper guide member 33, however, may be omitted by causing the electric fan 42 to supply air toward the color paper 15 in the direction of the arrow A in FIG. 2 so as to reverse the advance direction of the color paper 15 by virtue of a wind pressure.

Figure 6:
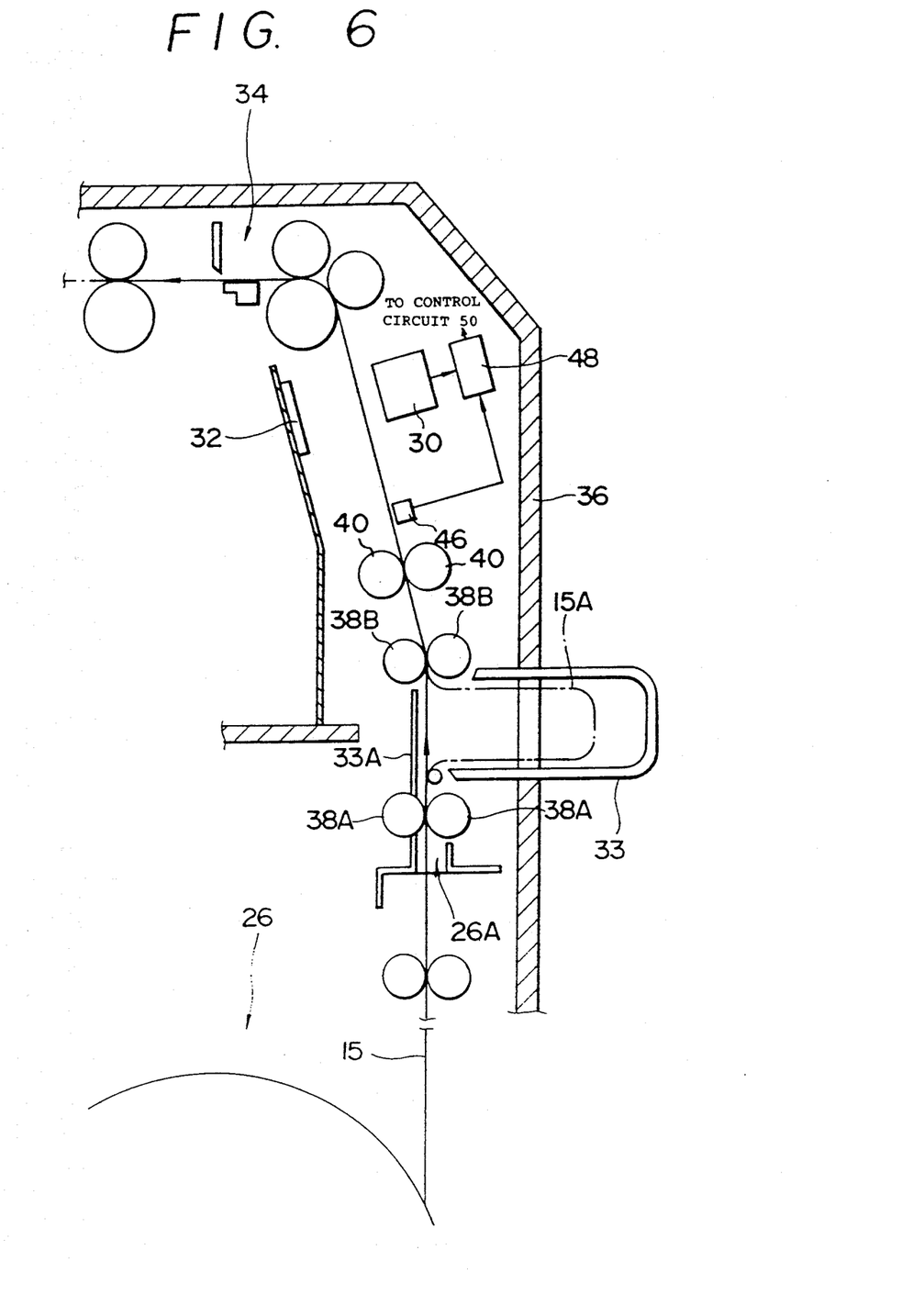

In this embodiment the density measuring means comprises the electric fan 42 and the densitometer 30 in which the electric fan 42 cools the light-sensitive material so as to obtain an image density signal free from the influence of temperature. The density measuring means may, however, be comprised of the densitometer 30, a temperature sensor 46 and a correcting circuit 48 as shown in FIG. 6. In this case, the correcting circuit 48 corrects the image density measured by the densitometer 30 in accordance with the temperature of the color paper 15 measured by the temperature sensor 46 such that the image density is magnified in proportion to an increase in temperature. Thus the image density signal is free from the influence of temperature.

Figure 7:
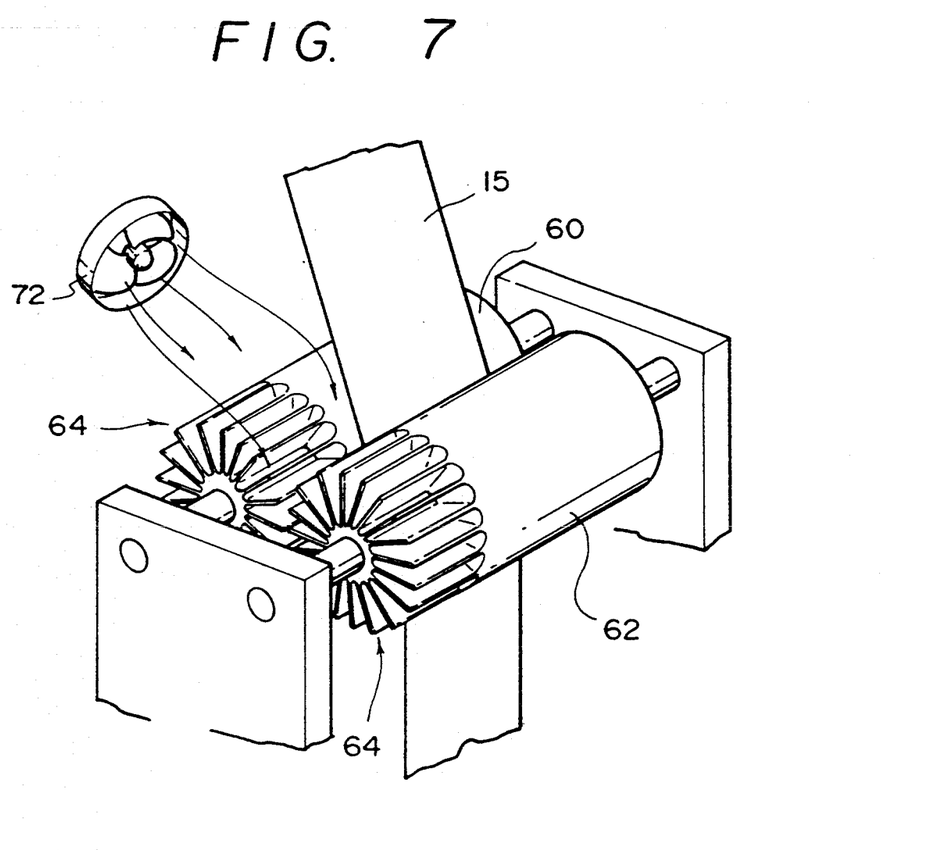
FIGS. 7 and 8 are perspective views showing rollers for holding and cooling a color paper according to other embodiments of the present invention.

Other embodiments of the present invention will be described. Rollers having a cooling function are used in the cooling section to cool the light-sensitive material held between them. Specifically, the roller pair (e.g. the roller pair 38A, 38B of FIG. 2) for holding the color paper 15 therebetween and provided on the light-sensitive material exit side of the drying section 26 is made in the form of rollers 60 and 62 provided with fins as shown in FIG. 7 to cool the color paper 15. The rollers 60 and 62 are made from a good heat-conducting material such as metal. An end portion of each of the rollers 60 and 62 that does not hold the color paper 15 is formed with cooling fins 64. In spite of the fact that the temperature of the rollers 60 and 62 increases because they hold the color paper 15 whose temperature has increased during the drying operation, a large quantity of room-temperature air applied to the fins 64 by a fan 72. Therefore, the color paper 15 passing between the rollers 60 and 62 is indirectly cooled. The densitometer 30 can then provide the image density signal free from the influence of temperature.

Figure 8:
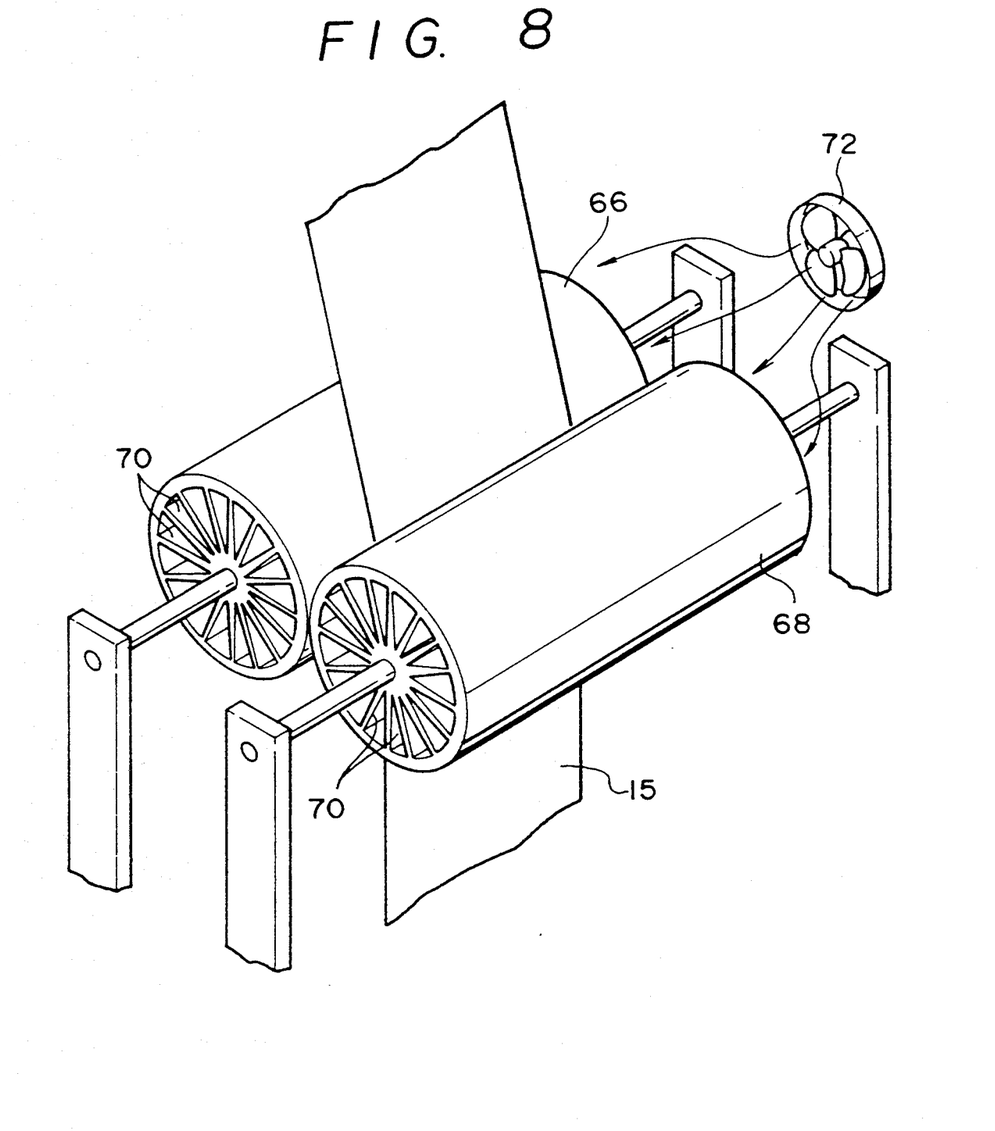

Further, the roller pair for cooling the light-sensitive material may be made in the form of rollers 66 and 68 as shown in FIG. 8. Specifically, the rollers 66 and 68 are made from good heat-conducting material and formed with vent through holes 70 which pass parallel with and are distributed around the axis. The rollers 66 and 68 whose temperature has increased by holding the light-sensitive material are cooled by a large quantity of room-temperature air which is applied to either end of each roller and passes through the vent through holes 70. Therefore, the color paper 15 is indirectly cooled.

Thus, the image density signal free from the influence of temperature is provided.

According to the present invention, the exposure conditions are corrected in accordance with the image density signal free from the influence of the temperature of the light-sensitive material; therefore, optimal exposure conditions can be set.

Further, the image density signal free from the influence of temperature is provided after cooling the light-sensitive material; therefore, the output of the density measuring section becomes stable because the temperature variation of the density measuring section is decreased.

What is claimed is:

1. A photograph processing device comprising
   an exposing section for printing an image on a light-sensitive material in accordance with exposure conditions,
   a processor section for performing developing, fixing, washing and drying operations with respect to the printed light-sensitive material,
   image density measuring means provided in the vicinity of the light-sensitive material exit side of the processor section for photometering the light-sensitive material, the density measuring means providing an image density signal free from the influence of temperature that is caused by subjecting the light-sensitive material to the drying operation, and
   exposure condition correcting means for correcting the exposure conditions in accordance with the image density signal provided from the density measuring means.

2. A photograph processing device according to claim 1, wherein the density measuring means comprises a cooling section provided in the vicinity of the light-sensitive material exit side of the processor section for cooling the light-sensitive material, a density measuring section for measuring the image density of the cooled light-sensitive material, and image density signal output means for outputting the image density signal on the basis of the data measured by the density measuring section.

3. A photograph processing device according to claim 2, wherein the cooling section includes a first blowing unit, the light-sensitive material being cooled by the wind from the first blowing unit.

4. A photograph processing device according to claim 2, wherein the cooling section includes cooling means for cooling the light-sensitive material while transferring it.

5. A photograph processing device according to claim 3, wherein the first blowing unit is provided between the processor section and the density measuring section.

6. A photograph processing device according to claim 3, wherein the first blowing unit is provided in the density measuring section.

7. A photograph processing device according to claim 3, wherein the first blowing unit is provided with a cooling fan.

8. A photograph processing device according to claim 1, wherein the density measuring means comprises a temperature measuring section provided on the downstream side of the processor section for measuring the temperature of the dried light-sensitive material, a density measuring section provided on the downstream side of the processor section for measuring the image density of the dried light-sensitive material, a correcting section for correcting the image density measured by the density measuring section in accordance with the temperature measured, and image density signal output means for outputting the image density signal on the basis of the image density corrected by the correcting section.

9. A photograph processing device according to claim 8, wherein the correcting section includes a correcting circuit for correcting the image density such that it is magnified in proportion to an increase in the temperature measured.

10. A photograph processing device comprising:
    an exposing section for printing an image on a light-sensitive material in accordance with exposure conditions,
    a processor section for performing developing, fixing, washing and drying operations with respect to the printed light-sensitive material,
    image density measuring means provided in the vicinity of the light-sensitive material exit side of the processor section for photometering the light-sensitive material, the density measuring means providing an image density signal free from the influence of temperature that is caused by subjecting the light-sensitive material to the drying operation, the density measuring means comprising
      a cooling section provided in the vicinity of the light-sensitive material exit side of the processor section for cooling the light-sensitive material, the cooling section including cooling means for cooling the light-sensitive material, and the cooling means including a cooling roller for cooling the light-sensitive material while holding and transferring it,
      a density measuring section for measuring the image density of the cooled light-sensitive material, and
      image density signal output means for outputting the image density signal on the basis of the data measured by the density measuring section, and
    exposure condition correcting means for correcting the exposure conditions in accordance with the image density signal provided from the density measuring means.

11. A photograph processing device according to claim 10, further including roller cooling means for cooling the cooling roller.

12. A photograph processing device according to claim 11, wherein the roller cooling means includes a second blowing unit for applying a cooling wind to the cooling roller.

13. A photograph processing device according to claim 12, wherein the cooling roller is provided with cooling fins and cooled via the fins by the wind from the second blowing unit.

14. A photograph processing device according to claim 12, wherein the cooling roller is formed with vent through holes and cooled via the vent through holes by the wind from the second blowing unit.

15. A photograph processing device according to claim 12, wherein the second blowing unit is provided with a cooling fan.

16. A photograph processing device comprising
    an exposing section for printing an image on a light-sensitive material in accordance with exposure conditions, a processor section for performing developing, fixing washing and drying operations with respect to the printed light-sensitive material, a cooling section provided in the vicinity of the light-sensitive material exit side of the processor section for cooling the light-sensitive material, a density measuring section for measuring the image density of the cooled light-sensitive material, image density signal output means for outputting an image density signal on the basis of data measured by the density measuring section, and exposure condition correcting means for correcting the exposure conditions in accordance with the image density signal outputted from the image density signal output means.

17. A photograph processing device according to claim 16, wherein the cooling section includes a first blowing unit, the light-sensitive material being cooled by the wind from the first blowing unit.

18. A photograph processing device according to claim 16, wherein the cooling section includes cooling means for cooling the light-sensitive material while transferring it.

19. A photograph processing device according to claim 18, wherein the cooling means includes a cooling roller.

20. A photograph processing device according to claim 19, further comprising roller cooling means for cooling the cooling roller.

21. A photograph processing device comprising an exposing section for printing an image on a light-sensitive material in accordance with exposure conditions.

a processor section for performing developing, fixing, washing and drying operations with respect to the printed light-sensitive material, a temperature measuring section provided on the downstream side of the processor section for measuring the temperature of the dried light-sensitive material, a density measuring section provided on the downstream side of the processor section for measuring the image density of the dried light-sensitive material, a correcting section for correcting the image density measured by the density measuring section in accordance with the temperature measured, image density signal output means for outputting an image density signal on the basis of the image density corrected by the correcting section, and exposure condition correcting means for correcting the exposure conditions in accordance with the image density signal outputted from the image density signal output means.

22. A photograph processing device according to claim 21, wherein the correcting section includes a correcting circuit for correcting the image density such that it is magnified in proportion to an increase in the temperature measured.

23. A photograph processing device, comprising:

an exposure section for printing an image on a light-sensitive material in accordance with exposure conditions;

a processor for performing developing, fixing, washing and drying operations with respect to the printed light-sensitive material;

a cooling section for actively cooling the light-sensitive material which is heated during the drying operation;

an image density measuring unit for determining an image density signal from the cooled light-sensitive material; and an exposure condition correction unit for correcting the exposure conditions in accordance with the image density signal produced by said image density measuring unit.

24. A photograph processing device comprising:

an exposing section for printing an image on a light-sensitive material in accordance with exposure conditions, a processor section for performing developing, fixing, washing and drying operations with respect to the printed light-sensitive material, image density measuring means provided in the vicinity of the light-sensitive material exit side of the processor section for photometering the light-sensitive material, the density measuring means providing an image density signal free from the influence of temperature that is caused by subjecting the light-sensitive material to the drying operation, the density measuring means comprising a cooling section provided in the vicinity of the light-sensitive material exit side of the processor section for cooling the light-sensitive material, and exposure condition correcting means for correcting the exposure conditions in accordance with the image density signal provided from the density measuring means.

* * * * *